United States Patent [19]

Asada et al.

[11] 4,412,057

[45] Oct. 25, 1983

[54] PROCESS FOR MANUFACTURING AROMATIC POLYESTERS

[75] Inventors: Masahiro Asada, Kobe; Miyuki Matsuura, Nishinomiya; Kazuya Yonezawa, Kobe, all of Japan

[73] Assignee: Kanegafuchi Kagaku Kogyo Kabushiki Kaisha, Osaka, Japan

[21] Appl. No.: 331,463

[22] Filed: Dec. 16, 1981

[51] Int. Cl.³ .................... C08G 63/18; C08G 63/24
[52] U.S. Cl. ............................ 528/179; 528/125; 528/126; 528/128; 528/169; 528/173; 528/180; 528/182; 528/191; 528/193; 528/194; 528/486; 528/487; 528/491
[58] Field of Search ............................ 528/179–182, 528/169, 173, 486, 487, 491, 125, 126, 128, 191, 193, 194, 176

[56] References Cited

U.S. PATENT DOCUMENTS 3,230,195 1/1966 Conix ................................ 260/47
3,388,097 6/1968 Cramer ............................. 260/47
4,334,053 6/1982 Freitag et al. ..................... 528/179

Primary Examiner—Lester L. Lee
Attorney, Agent, or Firm—Armstrong, Nikaido, Marmelstein & Kubovcik

[57] ABSTRACT

A process for manufacturing an aromatic polyester by reacting an aromatic dicarboxylic acid dichloride with an alkali metal salt of a bisphenol comprises adding 0.01 to 100 mol %, based on the total monomer quantity, of an acid halide into the reaction system.

12 Claims, No Drawings

PROCESS FOR MANUFACTURING AROMATIC POLYESTERS

BACKGROUND OF THE INVENTION

1. Field of the Invention

This invention relates to a process for manufacturing aromatic polyesters, and more particularly, to an improvement in the interfacial polymerization process for manufacturing aromatic polyesters.

2. Description of the Prior Art

A number of processes, such as interfacial, solution or melt polymerization, are known for the manufacture of aromatic polyesters. Japanese Patent Publication No. 1959/1965 discloses an interfacial polymerization process in which aromatic dicarboxylic acid chlorides dissolved in an organic solvent which is incompatible with water are mixed with bisphenols dissolved in an aqueous alkali solution. Japanese Patent Publication No. 5599/1962 discloses a solution polymerization process which comprises reacting aromatic dicarboxylic acid chlorides and bisphenols in an organic solvent. Japanese Patent Publications Nos. 15247/1963 and 28119/1968 disclose a melt polymerization process which comprises heating phenyl esters of aromatic dicarboxylic acids and bisphenols together. The aromatic polyesters prepared by these processes have outstanding heat resistance, and mechanical and electrical properties, and are useful for a wide range of applications, including the manufacture of molded products, films and fibers.

According to the known interfacial polymerization process, a solution of an aromatic dicarboxylic acid chloride in an organic solvent incompatible with water, and a solution of a bisphenol in an aqueous alkali solution are mixed together under intensive agitation. A product having a high degree of polymerization can be obtained if a quaternary ammonium or phosphonium salt is used as a catalyst. If the agitation is discontinued, the reaction product is usually separated into an aqueous solution phase containing inorganic salts, and a cloudy or opaque organic solvent phase consisting mainly of a polymer, but the organic solvent phase contains water in the form of an emulsion. There are even some cases in which no phase separation occurs. It is, therefore, necessary to seperate a lot of water from the polymer. In order to overcome these disadvantages, it has been proposed to adjust the pH value of the aqueous phase to at least 12 and heat it to destroy the emulsion (Japanese Patent Publication No. 2679/1978), treat the reaction product with an aqueous solution containing a lower aliphatic alcohol which is soluble in acetone or water (Japanese Patent Publication No. 12133/1980), use a centrifugal separator (Japanese Laid-Open Patent Specification No. 55286/1973), or employ specific agitating conditions (Japanese Patent Publication No. 41249/1980). The invetors of this invention have found it possible to overcome the disadvantages if a catalyst composed of a specific compound, i.e., an oil-soluble phase transfer catalyst, is employed.

SUMMARY OF THE INVENTION

The inventors have further discovered that the organic solvent phase containing the polymer, and the aqueous phase can be separated from each other quickly after the discontinuation of agitation if the specific compound is incorporated into the reaction system.

Thus, this invention provides a process for manufacturing an aromatic polyester by reacting an aromatic dicarboxylic acid dichloride with an alkali metal salt of a bisphenol, characterized by adding 0.01 to 100 mol % of an acid halide, based on the total monomer quantity, into the reaction system.

DETAILED DESCRIPTION OF THE INVENTION

Although various acid halides can be employed in accordance with this invention, it is particularly desirable to use acid monohalides typically represented by formula (1):

$$R-Y-X \qquad (1)$$

in which R stands for a monovalent organic group such as an alkyl, alkenyl or aromatic such as aryl or aralkyl group, or the substituted product thereof, Y stands for a divalent group such as $-CO-$, $-SO_2-$, $-SO-$, $-PO_2-$ or $-PO-$, and X stands for a halogen atom such as F, Cl or Br. It is usually suitable to use as R a group having 1 to 30 carbon atoms. Specific examples of these halides may include acetic acid chloride, butyric acid chloride, octylic acid chloride, benzoyl chloride, benzenesulfonyl chloride, benzenesulfinyl chloride, and benzenephosphonyl chloride, and the substituted products thereof.

The quantity of the specific compound may usually be in the range of 0.01 to 100 mol %, or preferably 1 to 100 mol %, or from economical view not more than 30 mol % based on the total monomer quantity, depending on polymerization conditions.

The specific compound may be added during the course of the polymerization reaction, or preferably at a time after the polymerization conversion, which means polymer per monomers in weight %, becomes 50 or more preferably after when the polymerization reaction terminates substantially. In order to obtain a higher molecular weight, however, it is desiarable to add it after the completion of the polymerization, i.e., after the intended degree of polymerization has been reached.

If it is added after the completion of the polymerization reaction, it is sufficient to effect agitation for a period of 5 to 30 minutes thereafter. Even if agitaion is continued for a longer time, the two phases can be separated from each other quickly after the agitation has been discontinued. Any inorganic salt resulting from polymerization is fully extracted into the aqueous phase at a temperature usually between 0°–100° C.

According to the prior invention of the inventors, the use of an oil-soluble phase transfer catalyst (hereinafter called PTC) made it possible to produce an aromatic polyester having a high molecular weight, while preventing the reaction system from causing emulsification. This invention provides a further improved process which enables improved separation of the organic solvent phase containing polymer from aqueous phases. If a crown ether, which is one of the oil-soluble PTC, is employed, however, this invention does not produce any greatly improved result, since it itself works very effectively for phase separation.

In order to manufacture aromatic polyesters in accordance with this invention, it is possible to use any known aromatic dicarboxylic acid dihalide, and any known bisphenol. The preferred dihalides, especially dichlorides are shown by the formula:

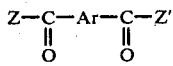

wherein Ar is divalent aromatic group usually containing 8–30 carbon atoms such as

where l, m are each 0 or 1 and in preference both m and n are not 0 at the same time, A is a divalent hydrocarbon containing 1–10 carbon atoms such as alkylene, cycloalkylene, alkylidene, cycloalkylidene groups halogen substituted groups therof or a nucleus substituted group thereof or a member selected from —O—, —S—, —SO$_2$—, —CO—, —PO$_2$— and —PO—, and Z, Z' are each halogen atom. Examples of the dichlorides may include terephthalic or isophthalic acid chloride, or other compounds having a functional group in the same aromatic ring, 2,2-(4,4'-dichlorocarbonyl-diphenyl)propane, (4,4'-dichlorocarbonyl-diphenyl)ether, polynuclear aromatic dicarboxylic acid dichlorides, 1,4-naphthalene dicarbonic acid dihalide, 2,6-naphthalene dicarbonic acid dihalide the nuclear-substituted compounds thereof and mixtures of foregoing compounds. Any of known bisphenols may be employed for the present invention. Among them preferred, ones usually containing 6–30 carbon atoms are shown by the formula:

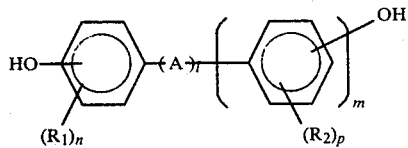

where, n, p are whole numbers of 0 to 4, R$_1$, R$_2$ are each a member selected from a group hydrocarbon or substituted hydrocarbon group containing 1 to 20 carbon atoms such as alkyl, alkenyl, alkynyl, aryl, aralkyl, alkoxyl, aryloxyl, arylalcoxyl, thioalkyl, alkylamino or arylamino, halogen and nitro groups.

One can find further advantage which is shown as remarkable decrease in clouring which otherwise occurrs in the stage of drying the resulted polymer, when a bisphenol having at least one substituted group located on ortho position against the phenolic OH group, this case meeting $1 \leq n+p \leq 8$ in the above formula, is employed. Examples of the bisphenols may include bis(3-methyl-4-hydroxyphenyl)methane, 2,2-bis(3-methyl-4-hydroxyphenyl)propane, bis(3-methoxy-4-hydroxyphenyl)methane, 2,2-bis(3-methoxy-4-hydroxyphenyl)propane, bis(3-chloro-4-hydroxyphenyl)methane, (3-isopropyl-4-hydroxyphenyl)ether, bis(4-hydroxy-4-hydroxy-2,6-dimethol-3-methoxyphenyl)methane, 2,2bis(-2,6-dimethyl-3-methoxyphenyl)methane, 2,2-bis(3,5-dimethyl-4-hydroxyphenyl)propane, 2,2-bis(3,5-di-sec-butyl-4-hydroxyphenyl)propane, 2,2-bis(3,5-di-tert-butyl-4-hydroxyphenyl)propane, bis(3,5-dimethyl-4-hydroxyphenyl)methane, 1,1-bis(3,5-dimethyl-4-hydroxyphenyl)ethane, 1,1-bis(3,5-dimethyl-4-hydroxyphenyl)cyclohexane, 2,2-bis(3,5-dichloro-4-hydroxyphenyl)propane, 2,2-bis(3,5-dibromo-4-hydroxyphenyl)propane, 2,2-bis(3-bromo-4-hydroxy-5-methylphenyl)propane, bis(3,5-dimethyl-4-hydroxyphenyl)sulfone, bis(3,5-dimethyl-4-hydroxyphenyl)ketone, bis(3,5-dimethyl-4-hydroxyphenyl)ether, bis(3,5-dimethyl-4-hydroxyphenyl)sulfide, 2,2-bis(3,5-dimethyl-4-hydroxyphenyl)hexafluoropropane, 2,2-bis(3,5-dimethoxy-4-hydroxyphenyl)propane, bis(3,5-dimethoxy-4-hydroxyphenyl)methane, 2,2-bis(3-methoxy-4-hydroxy-5-methylphenyl)propane, bis(3-methoxy-4-hydroxy-5-methylphenyl)methane, 2,2-bis(3,5-diphenyl-4-hydroxyphenyl)propane, bis(3,5-diphenyl-4-hydroxyphenyl)methane, 2,2-bis(3,5-diphenoxy-4-hydroxyphenyl)propane, bis(3-phenoxy-4-hydroxy-5-methyl)methane, 3.3', 5.5'-tetramethyl-4.4'dihydroxy-biphenyl,3.3', 5.5'-tetraphenyl-4.4'-dihydroxy-biphenyl, 1.4-dihydroxy-2-methoxy-benzene, 1.3-dihydroxy-6-methoxy-benzene. Those bisphenols are used in sole, in a mixture, or in combination of (A) the above compounds having a nucleus substituted group with (B) those having no such substitution or with a polyaromatic diol such as 1.4-maththalene diol. In the use of the above combination (A)/(B) is 100/0 to 1/99 by mol, in preference 100/0 to 10/90 by mol. The instant bisphenols are introduced into a reaction system in a form of alkali solution.

The phase transfer catalysts used in the present invention are quaternary ammonium salts, quaternary phosphonium salts, crown ethers, and the like. Examples of the quaternary ammonium salts are, for instance, tetraethyl ammoniumchloride, tetrabutyl ammonium chloride trioctylmethylammonium chloride, benzyltributylammonium chloride, benzyltriethylammonium chloride, benzyltrimethylammonium chloride, cetyldimethylbenzylammonium chloride, octyltriethylammonium bromide, decyltriethylammonium bromide, lauryltriethylammonium bromide, cetyltriethylammonium bromide, N-lauryl-pyridinium chloride, N-laurylpyridinium bromide, N-heptylpyridinium bromide, and the like. Examples of the quaternary phosphonium salt are, for instance, tetrabutylphosphonium bromide, triethyloctadecylphosphonium bromide, tetraphenylphosphonium bromide, triphenylmethylphosphonium bromide, trioctylethylphosphonium bromide, cetyltriethylphosphonium bromide, and the like. As crown ether, there can be all of those capable of forminng a complex with an alkali metal ion so as to activate a phenolate ion to be paired, e.g. 18-crown-6, dibenzo-18-crown-6, dicyclohexyl-18-crown-6, dibenzo-24-crown-8, 12-crown-4, 15-crown-5, cyclohexyl-12-crown-4, tribenzo-18-crown-6, tetrabenzo-18-crown-6, dibenzo-26-crown-6, and the like. The amount of the catalyst is selected from 0.01 to 20% by mole, preferably 0.1 to 10% by mole, based on the total acid dichloride.

It is possible to use any organic solvent if it is substantially insoluble in water. It is usual to employ a chlorinated hydrocarbon, such as methylene chloride, chloroform, ethylene dichloride, 1,1,2-trichloroethane, 1,1,2,1-tetrachloroethane, or orthodichlorobenzene, but it is also possible to use an organic solvent which is inactive for the reaction, for example, nitrobenzene, toluene or xylene.

Further, monofunctional compound such as phenols, thiols or amines may be added in order to obtain a polymer having an exactly desired molecular weight during the repeated reactions. The polymerization reaction is effected usually at a temperature between 0°–100° C. for about 2 to 5 hours.

The aromatic polyester thus produced can be recovered by a common method after the organic phase containing the polymer has been separated from the aqueous phase. For example, it is possible to precipitate the polymer by incorporating an organic solvent which does not dissolve the polymer, or pour the reaction product into hot water to evaporate the solvent and solidify the polymer. It is also possible to obtain a polymer film directly by casting the solution. The polymer can, thus, be collected in the form of powder, particles, a film or fibers.

The invention will now be described in further detail with reference to several examples which do not limit the scope of the invention.

EXAMPLE 1

5.7 g (0.025 mol) of 2,2-bis(4-hydroxyphenyl)propane and 3.2 g (0.0125 mol) of bis(3,5-dimethyl-4-hydroxyphenyl)methane were dissolved in 150 ml of water containing 5.63 g of sodium hydroxide. 7.62 g (0.0375 mol) of terephthalic acid chloride were dissolved in 150 ml of methylene chloride, and 0.38 g of trioctylmethylammonium chloride was added thereinto. The two solutions thus prepared were mixed, and reacted with each other for two hours at ordinary room temperature under intensive agitation. When the agitation was discontinued, a polymer solution in the form of oil droplets was found in the reaction system. Added thereinto were 1.22 g (0.0087 mol) of benzoyl chloride, and agitation was continued again for five minutes. The agitation was discontinued, and the contents of the reactor were separated completely into an aqueous phase and an organic phase in five minutes. The inherent viscosity $[\eta]$ of the resulted polymer was observed as 0.6. The viscosities were measured in $CHCl_3$ at 32° C. in all examples.

EXAMPLE 2

2.28 g (0.01 mol) of 2,2-bis(4-hydroxyphenyl)propane were dissolved in 20 ml of water containing 1 g of sodium hyroxide. 1.02 g (0.005 mol) of terephthalic acid chloride and 1.02 g (0.005 mol) of isophthalic acid chloride were dissolved in 40 ml of methylene chloride, and 0.12 g of benzyltriethylammonium chloride was added thereinto. The two solutions thus prepared were mixed at a temperature of 0° to 10° C. under intensive agitation. When the agitation was discontinued after three hours, the methylene chloride phase was cloudy, and not completely separated from the aqueous phase. Added thereinto was 0.61 g (0.0043 mol) of benzoyl chloride, and agitation was continued again for five minutes, whereby the reaction product was immediately separated into a transparent organic phase and an aqueous phase. A polymer having 0.5 of $[\eta]$ was separated by reprecipitation with methanol from the organic phase employing a separatory funnel.

EXAMPLE 3

300 ml flast, equipped with stirrer and condenser was charged in nitrogen atmosphere with 1.52 g (6.67 m mol) 2,2-bis(4-hydroxyphenyl)-propane and 3.41 g (13.33 m mol) of bis(3.5-dimethyl-4-hydroxyphenyl)-methane, and then added a solution containing 0.38 g (0.40 m mol) of laurylpyridinium chloride (30% by wt aqueous solution), 4.00 g (50 m mol) of sodium hydroxide and 40 ml of water to make another solution comprising above momers, and finally cooled to 1° C. Into the flask, 4.10 g (20.2 m mol) of terephthalic acid dichloride which had been dissolved in 40 ml of methylenchloride and held at 1° C. was added at a time under stirring. With the collapse of time the system became more and more emulsified state and in 1,5 hours later the organic phase containing polymer and aquous phase could not at all separate from each other even when they were stood for a long time.

Thereafter, 0.5 ml of benzoyl chloride was added to the system and stirring the system was effected for 20 minutes. This time the two phases were entirely seperated each other after standing for a few minutes. After seperating the aquous phase by decantation from the system, the organic phase was neutralized using dil-hydrochloric acid and washed with water. A precipitation of white and fibrous polymer was obeserved when the resulted organic phase was poured into methanol. The polymer was then filtered off, washed with acetone and finally dried at 120° C. under a reduced pressure. Here, the white, non-coloured polymer having 0.950 of $[\eta]$ was obtained in the 100% yield.

EXAMPLE 4

A solution was prepared by disolving 1.14 g (5 m mol) of 2.2-bis(4-hydroxyphenyl)-propane and 1.28 g (5 m mol) of bis(3.5-dimethyl-4-hydroxyphenyl)-methane into an aquous solution containing 1.5 g of sodium hydroxide and 40 ml of water. Another solution prepared was by disolving 2.10 g of terephthalic acid dichloride into a mixed solvent containing 30 ml of methylene dichloride and 10 ml of toluene and then adding thereto 0.1 g (2.5 mol% of terephthalic acid dichloride) of trioctylmethyl ammonium as a catalyst. Two solutions were mixed and effected to the reaction between the monomers under vigorous agitation. An emulsified occured between the organic phase containing polymer and aquous phase accompanying the proceeding of the reaction and in 1.5 hours two phases could not seperate each other even when allowed to stand for a long time.

A small portion of the emulsion was taken out and dried. Thus obtained polymer was colored purple. On the other hand 0.5 ml of benzoyl chloride was added to the rest of the emulsion. The emulsion was stirred for 20 minutes and then two phases were seperated each other after allowing to stand in a few minutes. The procedure to obtain the polymer from the emulsion was followed after Example 3. The obtained polymer was not at all coloured even though it was dried at 100° C. $[\eta]$ of the polymer was 0.4.

What is claimed is:

1. In a process for manufacturing an aromatic polyester by reacting an aromatic dicarboxylic acid dichloride with an alkali metal salt of a bisphenol in an aqueous solution, the improvement which comprises adding 0.01 to 100 mol%, based on the total monomer quantity, of an acid monohalide into the reaction system at a time when the conversion degree is not lower than 50%.

2. A process for separating an aromatic polyester organic solvent phase from a reaction mixture of an aromatic dicarboxylic acid chloride in an organic solvent reacted with a solution of bisphenol in an aqueous solution, wherein an oil-soluble phase transfer catalyst consisting of an acid monohalide is added to the reaction mixture to separate the organic solvent phase containing the resultant polyester from the aqueous phase.

3. A process of claim 1, wherein said acid monohalide is added at a time after substantially terminating the polymerisation reaction.

4. A process of claim 1, wherein said acid monohalide is at least one of the compounds of the formula:

R—Y—X where R stands for a monovalent organic group, Y stands for a group selected from the group consisting of —CO—, —SO$_2$—, —SO—, —PO$_2$— and —PO—, and X stands for an halogen.

5. A process of claim 4, wherein said monovalent organic group is a divalent hydrocarbon group containing from one to 30 carbon atoms.

6. A process of claim 5, wherein said divalent hydrocarbon group is a member selected from a group consisting of alkyl group, alkenyl group, aryl group and aralkyl group.

7. A process of claim 1, wherein the amount of said acid monohalide is 0.01 to 100 mol% based on the total monomer quantity.

8. A process of claim 5, wherein the amount of said acid monohalide is one to 30 mol% based on the total monomer quantity.

9. A process of claim 1, wherein said aromatic polyester is prepared by polymerizing aromatic carboxylic acid dihalide and bisphenols.

10. A process of claim 7, wherein said carboxylic acid dihalide is a carboxylic dichloride containing from 8 to 30 carbon atoms.

11. A process of claim 7, wherein said bisphenol contains from 6 to 30 carbon atoms.

12. A process of claim 1, wherein said aromatic polyester is prepared in the presence of a phase transfer catalyst.

* * * * *